United States Patent [19]
Zimmerman et al.

[11] 3,800,242
[45] Mar. 26, 1974

[54] TEMPERATURE COMPENSATED LIQUID METERING SYSTEM AND METHOD

[76] Inventors: Carl W. Zimmerman; George V. Copland, both of Duncan, Okla. 73533

[22] Filed: Jan. 28, 1972

[21] Appl. No.: 221,708

Related U.S. Application Data

[60] Division of Ser. No. 106,997, Jan. 18, 1971, Pat. No. 3,699,320, and a continuation-in-part of Ser. No. 20,645, March 18, 1970, which is a continuation-in-part of Ser. No. 750,675, July 5, 1968, which is a continuation-in-part of Ser. No. 704,403, Feb. 9, 1968, abandoned.

[52] U.S. Cl.............. 331/66, 331/110, 331/142, 331/185
[51] Int. Cl.............................................. H03b 5/26
[58] Field of Search....... 331/142, 66, 65, 108, 110, 331/141

[56] References Cited
UNITED STATES PATENTS
3,205,294  9/1965  Maynard........................... 331/142
3,308,667  3/1967  Pearlman............................ 331/66
3,675,484  7/1972  Pederson ............................ 331/66

FOREIGN PATENTS OR APPLICATIONS
1,438,051  3/1966  France............................... 331/142

OTHER PUBLICATIONS
Wireless World, Dec. 1962, F. Butler, pgs. 583–589.

*Primary Examiner*—John Kominski
*Attorney, Agent, or Firm*—Burns, Doane, Swecker & Mathis

[57] ABSTRACT

Method and apparatus for correcting a manifestation of fluid flow for variations in the temperature of the fluid to provide an indication of volume corrected to a predetermined temperature. A novel transducer is provided through the utilization of a thermistor in the shunt arm of a parallel-T oscillator.

1 Claim, 7 Drawing Figures 3,800,242

TEMPERATURE COMPENSATED LIQUID METERING SYSTEM AND METHOD

REALTED APPLICATIONS

This application is a continuation-in-part of copending application Ser. No. 20,645, filed Mar. 18, 1970, for "Fluid Flow Metering Method and System," said application being a continuation-in-part of application Ser. No. 750,675, filed July 5, 1968 for "Fluid Flow Metering Method and System," said application Ser. No. 750,675 being a continuation-in-part of then copending application Ser. No. 704,403, filed Feb. 9, 1968, for "Fluid Flow Metering Method and System," and now abandoned. This is a division of application Ser. No. 106,997, filed Jan. 18, 1971, now U.S. Pat. Ser. No. 3,699,320.

BACKGROUND OF THE INVENTION

As has been described and claimed in the related applications cited supra and herein and hereby incorporated by reference, fluid flow responsive pulses may be utilized to gate packets of fluid condition responsive pulses to appropriate scaling and counting apparatus with the number of pulses in each packet being related to the condition of the fluid. The number of pulses accumulated can be made to vary in a manner related to the frequency response curve of the transducer utilized to sense the fluid condition. The frequency responsive curve of the transducer may increase or decrease with a change in the condition sensed as appropriate for the result desired.

The frequency response curve of the transducer may also vary reciprocally with the condition for which compensation is to be made. In such event, the circuit is modified so that the duration of the flowmeter pulse generated gating time interval is determined by the accumulation of a predetermined number of pulses from the condition responsive transducer. The actual pulses in the packets applied to the accumulator register during this time interval may be provided by a separate oscillator having a frequency sufficiently high to give the desired resolution. Thus, a reciprocal function may be used in producing the incremental mathematical multiplication product. Moreover, by causing the separate oscillator frequency to vary in accordance with a further condition of the fluid, the manifestation of fluid flow may be further compensated.

By modifying the frequency of the separate oscillator in accordance with a second condition of the fluid, the effects of modification of this second condition in a system wherein the condition responsive transducer is responsive to two conditions may be eliminated. This latter feature is particularly relevant in the metering of treated crude oil into a sales pipeline wherein the percentage of oil in the emulsion is quite high since the dielectric constant of oil/water emulsion is also a function of the temperature of the oil. Problems may, however, arise under such conditions where the fluid flow is intermittent in small quantities with the discrete temperature variations typical of time-shared net oil analyzer lease allocation systems.

The accurate metering of crude oil for custody transfer or lease allocation requires that product volumes metered under various temperature conditions be corrected to a standard temperature, usually 60°F. Tables of multipliers for performing such conversion have been published. These multipliers are essentially linear functions of temperature when plotted over the range of gravities and temperatures customarily found in crude oil production.

Flow meters have been equipped with mechanical temperature compensating devices. Such mechanical devices generally have a slow response to temperature changes and are thus unsuitable for the measurement of intermittent flow or the small quantities of fluid typical in the time-sharing of net oil analyzers among several leases for the allocation of oil production. Where several oil/water separators discharge liquid sequentially through the same net oil analyzer, the pulse output signals representing volume are diverted to the appropriate lease registers. The volume of liquid discharged during each separator dump may be as little as two barrels discharged typically in about 1 minute. Successive discharges from different separators to the same net oil analyzer may vary in temperature by as much as 30°F. due to the obtaining of the production fluid from differnt producing horizons. Moreover, a separator receiving fluid from a low production well may permit cooling of the fluid while accumulating enough fluid to actuate the dump control. Volumetric metering errors of several percent in the net oil volume can thus occur. However, the use of a long time constant compensating system incapable of following the temperature of the intermittent flow may produce less accurate results than if no compensation is attempted.

It is, accordingly, an object of the present invention to provide a novel method and apparatus for automatically correcting metered volumes for variations due to temperature changes.

It is another object of the present invention to provide a fast response digital method and system for compensating volumetric liquid flow measurements for variations in temperature.

It is still another object of the present invention to provide a novel temperature transducer in which the temperature variable resistance is connected in the shunt arm of a parallel-T oscillator.

It is yet another object of the present invention to provide a novel temperature transducer having high sensitivity and linearity.

It is still yet another object of the present invention to provide a novel method and apparatus for compensating a manifestation of fluid flow for variations in a physical condition of the fluid.

These and other objects and advantages of the present invention will be apparent from the claims and from the following detailed description when read in conjunction with the appended drawings.

THE DRAWINGS

Figure 1:
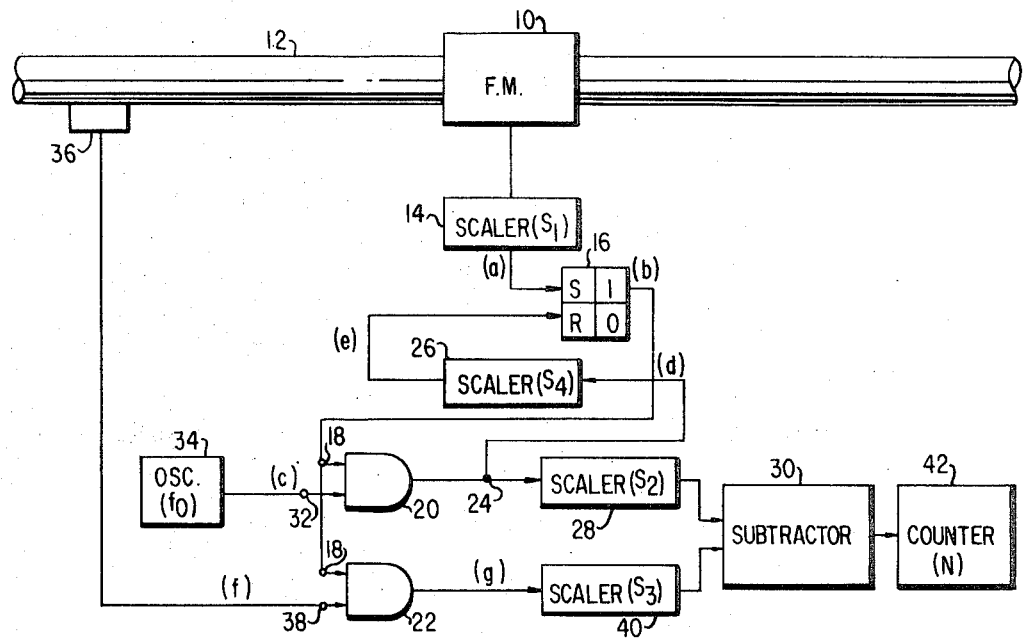
FIG. 1 is a functional block diagram of a preferred embodiment of the present invention.
Figure 3:
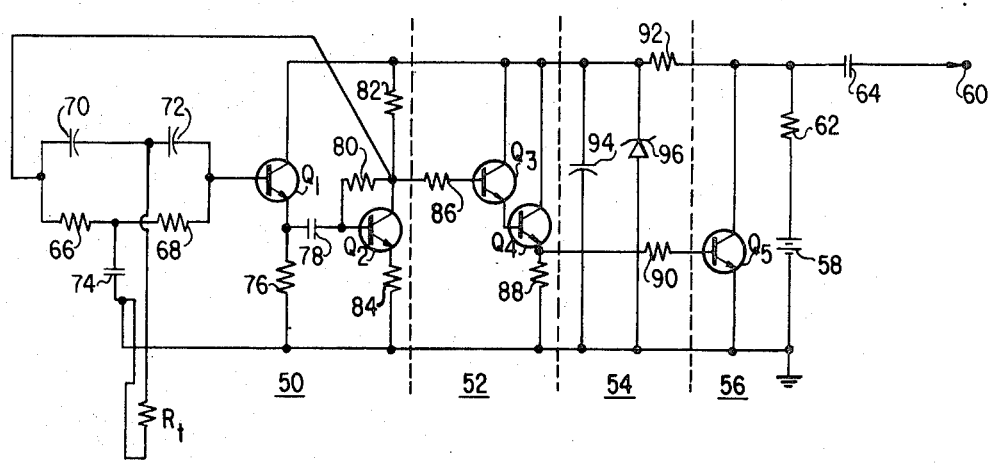
FIG. 3 is a schematic circuit diagram of the transducer of FIG. 1.
Figure 6:
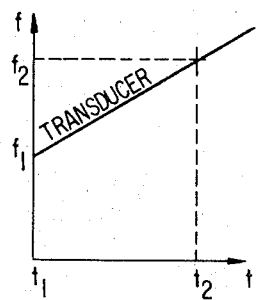
Figure 7:
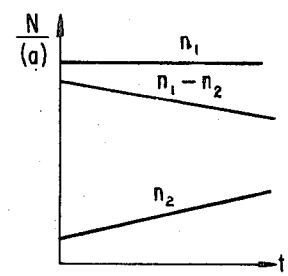

FIG. 6 is a graph showing the frequency response with respect to temperature of the parallel-T oscillator with a thermistor in the shunt leg thereof as utilized in the condition responsive transducer of FIG. 1; and, FIG. 7 is a graph illustrating the compensation achieved by utilizing the circuit of FIG. 3 as the transducer in FIG. 1 in producing a digital content representative of net oil at a predetermined temperature.

THE DETAILED DESCRIPTION

An understanding of the present invention may be gained from the following detailed description as set out in accordance with the Table of Contents:

TABLE OF CONTENTS

I. The Overall System
  A. The System
  B. System Operation
  C. Design Considerations
  D. Example
II. The Transducer
  A. The Transducer Circuit
  B. Transducer Operation
III. Advantages and Scope of the Invention

I. THE OVERALL SYSTEM

A. The System

With respect to FIG. 1, and as in the systems disclosed in the aforementioned related applications, the circuit of the present invention also produces packets of pulses wherein the number of packets is related to fluid flow and the number of pulses in each packet is related to a condition of the fluid by which the digital output signal from the flowmeter is to be modified.

A flowmeter 10 is illustrated in a fluid conduit 12 through which the fluid to be measured may flow. The flowmeter 10 may be conventional in its circuitry and operation and may, for example, be of the type described and claimed in U.S. Pat. No. 3,164,020 to Edward Groner et al., and assigned to the assignee of the present invention. Alternatively to the turbine mass flowmeter illustrated and claimed in the referenced patent, a suitable positive displacement matter may be employed.

The output signal from the flowmeter 10 is a series of pulses occurring at a frequency or pulse repetition rate related to the rate of fluid flow. While not shown, these pulses may be accumulated in a suitable conventional counter as an indication of gross fluid flow. These pulses may also be shaped as desired prior to their application to the counter (not shown) by a suitable conventional circuit.

The output signal from the flowmeter 10 may be applied to a suitable conventional scaler 14 having a scaling factor $S_1$. The scaler 14 may also be conventional both in circuitry and operation and may, by way of example, comprise a number of binary elements or flipflops serially connected so as to provide a single output pulse in response to the application of a predetermined number $S_1$ of input pulses.

The scaler 14 output signal is applied to the set input terminal S of a conventional bistable multivibrator or flipflop 16. The "true" or binary 1 output terminal of the flipflop 16 may be directly connected to an input terminal 18 of a pair of two-input terminal AND gates 20 and 22. The output terminal 24 of the AND gate 20 may be connected through a suitable conventional scaler 26 having a scaling factor $S_4$ to the reset input terminal of the flipflop 16. The output terminal 24 of the AND gate 20 may also be connected through a suitable conventional scaler circuit 28 having a scaling factor $S_2$ to a one-input terminal of a suitable conventional subtractor circuit 30. The subtractor 30 may, for example, be of the type illustrated and claimed in U.S. Pat. application Ser. No. 28,280 filed Apr. 21, 1970, by Edward W. Gass et al., and assigned to the assignee hereof.

The other input terminal 32 of the AND gate 20 may be directly connected to the output terminal of a suitable conventional oscillator 34 having a fixed frequency or pulse repetition rate $f_o$.

Also disposed in the conduit 12 and in operative contact with the fluid flowing through the conduit may be a suitable conventional condition-responsive transducer 36. The output signal from the transducer 36 is a series of electrical pulses having a frequency or pulse recurrence rate related to a condition of the fluid flowing through the conduit 12. This signal is applied to the other input terminal 38 of the AND gate 22.

The output signal from the AND gate 22 may be applied to a second input terminal of the subtractor 30 through a suitable conventional scaler 40 having a scaling factor $S_3$. The output signal from the subtractor 30 may be applied to a suitable conventional counter 42 which may, for example, be the Hecon series FR-967, commercially obtainable from Hengstler Numerics, Inc. of Palisades Park, New Jersey.

B. System Operation

Figure 2:
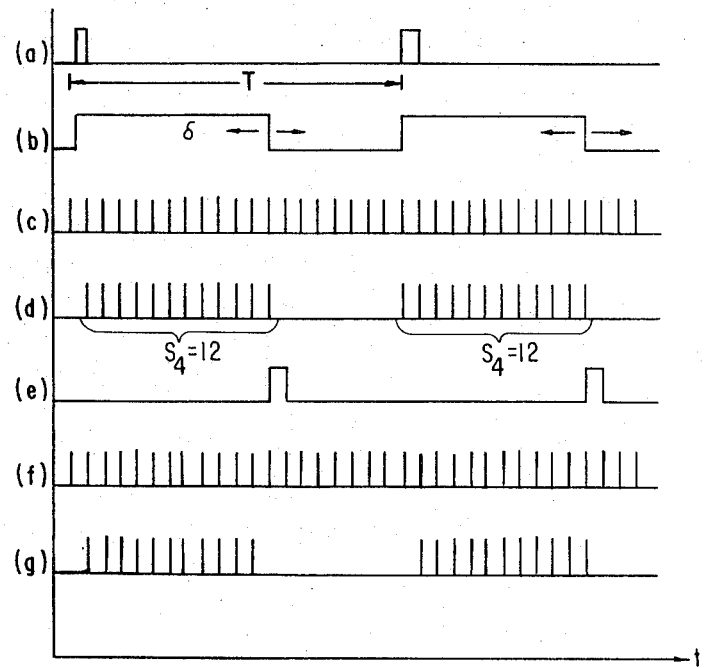
FIG. 2 is a timing diagram illustrating the operation of the circuit of FIG. 1.

The operation of the circuit of FIG. 1 may more easily be understood with reference to the waveforms of FIG. 2. With reference to FIG. 2, the output signal of the scaler 14 is illustrated as waveform (a). Responsively to the leading edge of the pulses in waveform (a), the flipflop 16 provides an output pulse having a duration $\delta$. The output signal from the flipflop 16 is illustrated as waveform (b) in FIG. 2.

The fixed frequency output signal from the oscillator 34 is illustrated in waveform (c) and, for the duration $\delta$ of the gating pulses in waveform (b), is applied through the AND gate 20. This signal is illustrated as waveform (d) in FIG. 2 and is applied to the input terminal of the scaler 26. A scaling factor $S_4$ of 12 is assumed in the illustrated embodiment and the scaler 26 will generate an output pulse responsively to the 12th input pulse. This signal is illustrated in waveform (e) and is applied to the flipflop 16 to effect the resetting thereof and thus the termination of the pulse in the waveform (b).

The bistable multivibrator 16, oscillator 34, gate 20 and scaler 26 thus function together as a monostable multivibrator which is triggered by each pulse from the scaler 14 and which has a predetermined duration $\delta$ as determined by the time interval necessary to accumulate the predetermined number of fixed frequency pulses from the oscillator 34 in the scaler 26.

Since the scaling factor $S_4$ of the scaler 26 determines the number of pulses in the waveform (d), and since waveform (d) is applied through scaler 28 to the subtractor 30, the number of pulses applied to the subtractor is flow-related, i.e., the scaling factor $S_4$ divided by the scaling factor $S_2$ for each time that the flipflop 16 is set in response to a flow pulse.

The pulse recurrence rate of the pulses in the output signal $f$ from the transducer 36 is continuously variable in response to a condition of the fluid. The AND gate 22 is gated on for a period of time $\delta$ concurrently with the enabling of the gate 20, earlier described. The pulses in the waveform (f) from the transducer 36 are thus passed through the AND gate 22 during the enabling thereof. This signal is illustrated in FIG. 2 as waveform (g) and is applied through the scaler 40 to the other input terminal of the subtractor 30. The number of pulses thus applied to the subtractor 30 is thus a function of fluid condition. The difference between the flow-related and condition-related pulses is accumulated in the counter 42.

As illustrated in FIG. 7, the number of pulses $n_2$ in the signal supplied by the scaler 40 is subtracted by the system from the number of pulses $n_1$ in the signal supplied by the scaler 28 in the subtractor 30 to produce a digital count N corrected to a standard temperature.

C. Design Considerations

With continued reference to the circuit of FIG. 1 and the waveforms of FIG. 2, it is necessary in the design of the present system that the flipflop 16 pulse width $\delta$ must be of sufficient duration to include enough cycles of the waveform (f) from the temperature transducer 36 to obtain the desired degree of resolution and accuracy. For example, the attainment of a 0.1 percent resolution requires that a minimum of 1,000 cycles be included within the period $\delta$ in waveform (b). The pulse width $\delta$ must, however, be less than the minimum spacing T between the adjacent pulses from the scaler 14 of FIG. 1. This requirement may be expressed as:

$$\delta < T \tag{1}$$

Since the flipflop 16 pulse width $\delta$ is a function of the scaling factor $S_4$ of the scaler 26 divided by the frequency $f_o$ of the oscillator 34, the scaling factor $S_4$ may be calculated as follows:

$$S_4 = \delta f_o \tag{2}$$

The scaling factor $S_3$ for the scaler 40 may be calculated as follows:

$$S_3 = (\delta/K)(f_2 - f_1/t_2 - t_1) \tag{3}$$

where $f_1$ is a frequency of the transducer at a temperature $t_1$ to which the liquid volume is to be corrected for registration;

where $f_2$ is the frequency of the transducer at a temperature $t_2$;

where $K$ is the temperature coefficient of volume expansion for the liquid as may be calculated from published tables as the change in multiplier factor divided by the change in temperature; and where $t_2$ may be either larger or smaller than $t_1$.

The number of pulses $n_1$ applied to the subtractor 30 from the scaler 28 in the gating interval $\delta$ may be expressed as follows:

$$n_1 = (S_4/S_2) \tag{4}$$

The scaling factor $S_2$ of the scaler 28 may be expressed as follows:

$$S_2 = (S_3 \delta f_o/S_3 + \delta f_1) \tag{5}$$

The number of pulses $n_2$ applied to the subtractor 30 from the scaler 40 in the gating interval $\delta$ is a function of the frequency of the transducer 36 and the gate width $\delta$ and may be expressed as:

$$n_2 = (\delta f/S_3) \tag{6}$$

Thus, the number of pulses N accumulated in the counter 42 for pulses in the waveform (a) of FIG. 2 may be expressed as $$N = a(n_1 - n_2) \tag{7}$$

or $$N = a S_4 [(1/S_2) - (f/f_o S_3)] \tag{8}$$

where $a$ is the total number of pulses in the waveform (a) and thus the number of gating intervals $\delta$.

D. Example

By way of example, T is selected as 0.11 seconds for compatibility with the counter 42, the frequency $f_o$ of the oscillator 34 is selected as 2 MHz and the temperature to which correction is desired is selected as 60°F. The change $f_2 - f_1$ in the frequency response from the transducer 36 for a change in temperature $t_2 - t_1$ may be taken from the graph of FIG. 6 subsequently to be described as 4,050 Hz/80°F.

For a crude oil of 10° API gravity, the multiplier factors are 1.0148 at 20°F. and 0.9785 at 120°F. The constant K may then be derived from published tables as the change in volume correction factor for the derived temperature range as follows:

$$K = [(1.0148 - 0.9785)/(120 - 20)] = 363 \times 10^{-6} \tag{9}$$

Selecting $\delta$ as 0.1 seconds and thereby complying with equation (1), the scaling factor $S_4$ of the scaler 26 may be calculated by equation (2) as follows:

$$S_4 = (0.1)(2 \times 10^6) = 2 \times 10^5 \tag{10}$$

The scaling factor $S_3$ of the scaler 40 may be calculated by equation (3) as follows:

$$S_3 = (0.1/363 \times 10^{-6})(4050)/(80) = 13{,}946 \tag{11}$$

The scaling factor $S_2$ of the scaler 28 may then be calculated by equation (5) as follows:

$$S_2 = [(13{,}946)(2 \times 10^5)/13{,}946 + 0.1(14{,}320)] = 181{,}376 \tag{12}$$

The accuracy of the system may be checked for 100 input pulses by means of equation (8) for 60°F as follows:

$$N_{60} = (100)(2 \times 10^5)\left(\frac{1}{181{,}376} - \frac{14{,}320}{(2 \times 10^6)(13{,}946)}\right) = 100 \tag{13}$$

For 140°F:

$$N_{140} = (100)(2 \times 10^5)\left(\frac{1}{181{,}376} - \frac{18{,}370}{(2 \times 10^6)(13{,}946)}\right) = 97.0969 \tag{14}$$

The indicated change in the volume V is thus:

$$V = 100 - 97.0959 = 2.9041 \tag{15}$$

The volume expansion V from 60°F to 140°F may be calculated for comparison with the indicated volume change as follows:

$$V = aK(t_2 - t_1) \qquad (16)$$

or $$V = (100)(363 \times 10^{-6})(140 - 60) = 2.9040 \qquad (17)$$

II. The Transducer

A. The Transducer Circuit

With reference now to FIG. 3, the transducer 36 of the present invention as illustrated in FIG. 1 may be divided roughly into an oscillator 50, and amplifier 52, a voltage regulation circuit 54 and a switching or line driver circuit 56 which controls the application of the potential of a battery 58 to the output terminal 60 by way of a resistor 62 and a capacitor 64.

The oscillator 50 includes a frequency determining RC combination known in the art as a parallel-T network. This network includes the resistors 66 and 68, capacitors 70, 72 and 74 and has thermistor $R_T$ in the shunt arm thereof. The capacitors 70 and 72 are series connected in parallel with the series connected resistors 66 and 68. The capacitor 70-capacitor 72 junction is isolated from ground by means of a temperature-responsive impedance, the thermistor $R_T$ and the resistor 66-resistor 68 junction is isolated from ground by the shunt capacitor 74. The capacitor 72-resistor 68 junction is directly connected to the base electrode of an NPN transistor Q 1.

The output signal from the transistor Q 1 is taken across a resistor 76 in the emitter circuit thereof and is supplied through a capacitor 78 to the base electrode of an NPN transistor Q 2. Appropriate bias is provided by the resistors 80, 82 and 84, and the output signal from the collector electrode of the transistor Q 2 is fed back to the capacitor 70-resistor 66 junction in the frequency-determining portion of the oscillator 50.

The output signal from the oscillator 50 is also applied through a resistor 86 to the base electrode of an NPN transistor Q 3 having the emitter electrode directly connected to the base electrode of an NPN transistor Q 4. The transistors Q 3 and Q 4 serve to amplify the output signal from the oscillator 50 and the amplified output signal is taken across a resistor 88 in the emitter circuit of the transistor Q 4.

The output signal from the amplifier 52 is applied through a resistor 90 to the base electrode of an NPN transistor Q 5 connected across the series connected battery 58 and resistor 62 earlier described. The resistor 92 and the parallel connected capacitor 94 and Zener diode 96 are utilized to smooth and regulate the voltage applied to the oscillator 50 from the battery 58 to prevent the line fluctuation induced by the conduction of the transistor Q 5 from being reflected in the frequency of the output signal from the oscillator 50.

Exemplary values for the various electrical circuit components of the circuit of FIG. 3 are as follows:

| Transistors Q₁-Q₄ | 2N2923 |
|---|---|
| Transistor Q₅ | EN697 |
| Resistor 62 | 100 ohms |
| Zener Diode 96 | IN 752 |
| Resistor 76 | 4.7 K ohms |
| Resistor 80 | 180 K ohms |
| Resistor 82 | 3.3 K ohms |
| Resistor 86 | 22 K ohms |
| Resistor 92 | 270 ohms |
| Capacitor 78 | 0.22 microfarads |
| Capacitor 94 | 10 microfarads |

B. Transducer Operation

In operation, the output signal from the oscillator 50 is fed back to the frequency determining parallel-T circuit. The frequency of this output signal is a function of the temperature to which the temperature responsive thermistor $R_T$ is exposed. The temperature responsive oscillator 50 output signal is amplified in the amplifier 52 and applied to the line driver circuit 56 to effect the fluctuations in the output signal taken from the output terminal 60 as a series of electrical pulses.

It is to be understood that the portion of the line driver circuit 56 to the right of the transistor Q 5 may be separated physically from the remainder of the circuit by several thousand feet, thereby considerably reducing the physical size of the transducer actually positioned on the pipeline.

Figure 4:
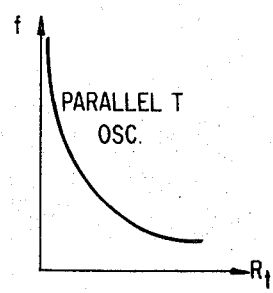
FIG. 4 is a graph of the typical frequency response of a parallel-T oscillator.
Figure 5:
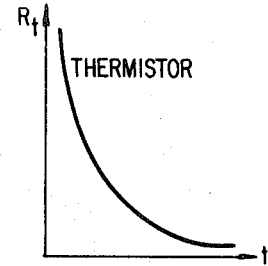
FIG. 5 is a graph showing the change in resistance with temperature of a typical thermistor.

The normal frequency response of a parallel-T oscillator 50 with respect to changes in the impedance of the shunt resistor $R_T$ is illustrated in FIG. 4. The change in impedance of the thermistor $R_T$ with changes in temperature is shown in FIG. 5. The unique combination of the temperature sensitive thermistor $R_T$ in the shunt leg of the parallel-T oscillator provides a linear frequency response of the transducer 36 of FIG. 3 with respect to changes in temperature over a temperature span of 150° F. or more due to the compensation of the non-linear temperature response characteristic of the thermistor $R_T$ for the non-linear frequency response characteristics of the parallel-T oscillator.

Control of the temperature span over which linearity is obtained may be accomplished through the selection of the thermistor $R_T$ and the design of the parallel-T network which may include the use of a fixed resistor (not shown) in series with the thermistor $R_T$ in the shunt arm thereof.

Due to the large temperature dependent temperature coefficient of the termistor $R_T$, the transducer 36 has a high sensitivity. For example, the temperature coefficient of the resistance of the thermistor $R_T$ at 25° C. may be an order of magnitude greater than that of a typical platinum resistance thermometer. A direct conversion from the resistance of the thermistor $R_T$ to frequency is thus obtained without the usual practice of converting the resistance of the sensing element to an analog d.c. voltage which is then used to drive a voltage controlled oscillator. The frequency of the oscillator itself is less sensitive to power supply voltage changes than the voltage controlled oscillators typically employed in such circuits.

ADVANTAGES AND SCOPE OF THE INVENTION

The unique temperature transducer described supra is linear, inexpensive, stable and fast in response and makes the system particularly applicable to intermittent flow of small quantities of liquid with step function temperature variations. The compensation for the non-linearity in the frequency response of parallel-T oscillator for variations in the resistance of the shunt arm thereof by the non-linearity of a thermistor as the temperature responsive resistor produces a linear frequency response over a wide range of temperature.

The linear temperature range may be easily shifted by the selection of the thermistor and the values of the circuit elements in the parallel-T oscillator. Sensitivity is great due to the sensitivity of the thermistor and response is fast while the oscillator is relatively insensitive to changes in supply voltage.

Direct conversion from thermistor resistance to oscillator frequency is possible without converting resistance to an analog voltage and thereafter utilizing the analog voltage to control a voltage controlled oscillator.

The novel transducer is moreover combined in a digital system which permits the selection of the volumetic correction factor to the temperature coefficient of the fluid by the adjustment of binary counting chains to modify scaling factors.

The present invention may thus be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A condition responsive transducer comprising:
   a parallel-T oscillator having a condition responsive element in the shunt leg of the frequency determining portion thereof, the impedance of said condition responsive element being non-linearly related to the condition in a manner which coacts with the non-linearity of the oscillator to thereby increase the linearization of the frequency response of the transducer with respect to the condition;
   a source of voltage remote from said oscillator;
   an output terminal remote from said oscillator;
   means for applying voltage from said source to said oscillator and to said output terminal;
   switch means adjacent to said oscillator and responsive to said oscillator for modifying the application of voltage from said source to said output terminal; and
   means adjacent to said oscillator for reducing the effect on said oscillator of voltage modifications on said output terminal.

* * * * *

UNITED STATES PATENT OFFICE
CERTIFICATE OF CORRECTION

Patent No. 3,800,242          Dated March 26, 1974

Inventor(s) Carl W. Zimmerman and George V. Copland

It is certified that error appears in the above-identified patent and that said Letters Patent are hereby corrected as shown below:

Col. 5, line 42, equation (3) change

"$S_3 = (\delta/K)(f_2-f_1 / t_2-t_1)$" to

--$S_3 = (\delta/K)[(f_2-f_1)/(t_2-t_1)]$--

Col. 6, line 48, equation (12) change

"$S_2 = [(13,946)(2 \times 10^5)/13,946+0.1(14,320)] = 181,376$" to

--$S_2 = (13,946)(2 \times 10^5)/[(13,946+0.1)(14,320)] = 181,376$--

Signed and sealed this 10th day of September 1974.

(SEAL)
Attest:

McCOY M. GIBSON, JR.          C. MARSHALL DANN
Attesting Officer             Commissioner of Patents